United States Patent [19]

Tynan

[11] 4,028,302

[45] June 7, 1977

[54] PROCESS FOR PREPARING CONCENTRATED ACRYLONITRILE POLYMER SOLUTIONS

[75] Inventor: Daniel Gregory Tynan, Wilmington, Del.

[73] Assignee: E. I. Du Pont de Nemours and Company, Wilmington, Del.

[22] Filed: Oct. 7, 1975

[21] Appl. No.: 620,422

[52] U.S. Cl. ................... 260/32.6 N; 260/30.8 R; 260/30.8 DS

[51] Int. Cl.$^2$ ................ C08K 5/07; C08K 5/36

[58] Field of Search .............. 260/32.6 N, 30.8 R, 260/30.8 DS

[56] References Cited

UNITED STATES PATENTS 3,010,932  11/1961  Stoveken ................ 260/32.6 N 3,635,917  1/1972  Roth et al. ................ 260/32.6 N Primary Examiner—Harry Wong, Jr.

[57] ABSTRACT

Clear, bubble-free acrylonitrile polymer solutions of high polymer concentration are rapidly prepared by feeding powdered acrylonitrile polymer to a cool zone of a twin-screw machine and injecting solvent to form a slurry at a temperature below 40° C., advancing the cool slurry to a heated zone and converting the slurry into a concentrated solution at 110° to 150° C. while intermittently squeezing it in directions transverse to the axes of the screws, and discharging the hot solution continuously from the machine. A zone of reduced pressure is provided to remove gases trapped in the slurry. A twin-screw machine for carrying out the process is disclosed.

4 Claims, 7 Drawing Figures

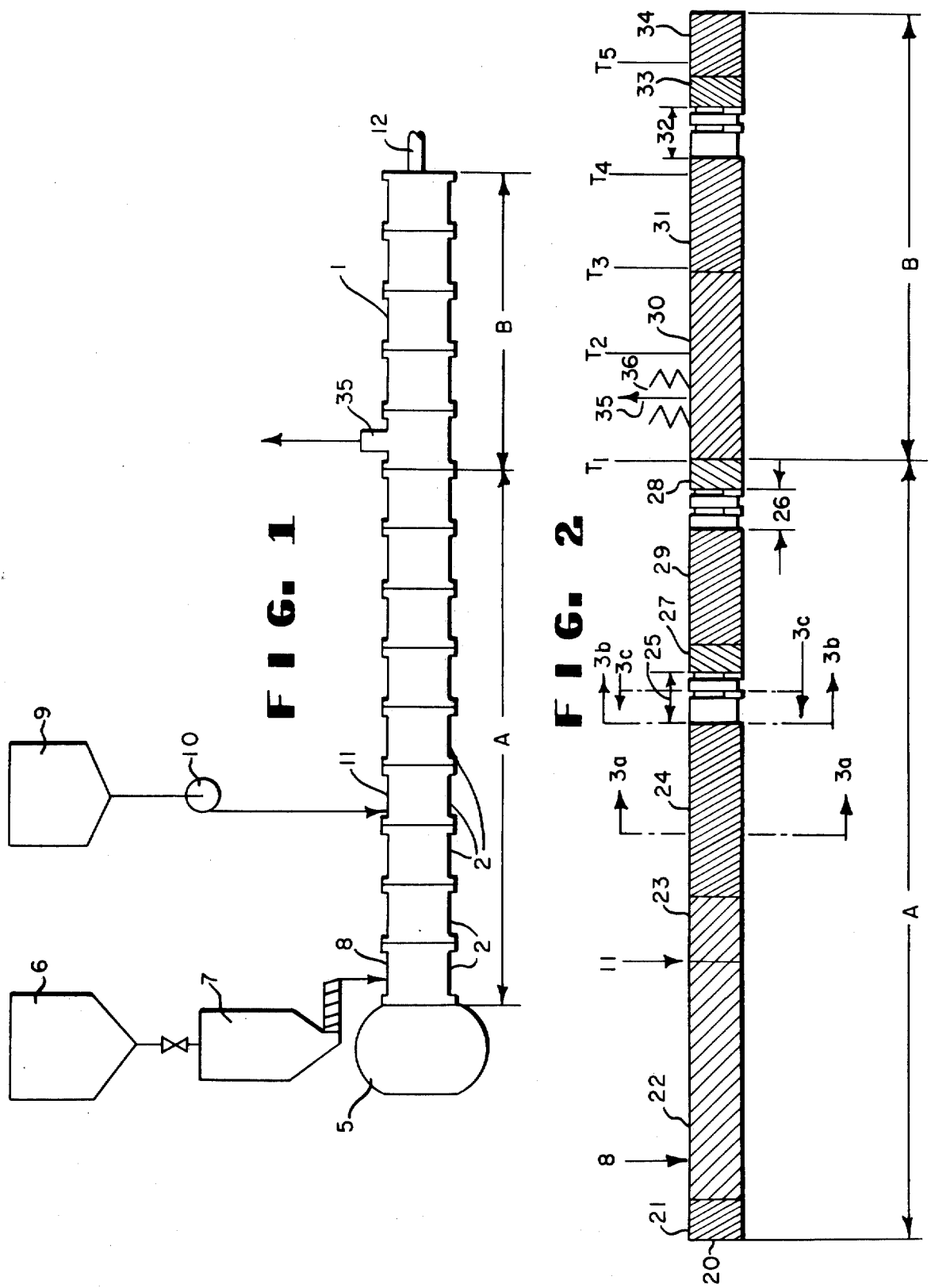

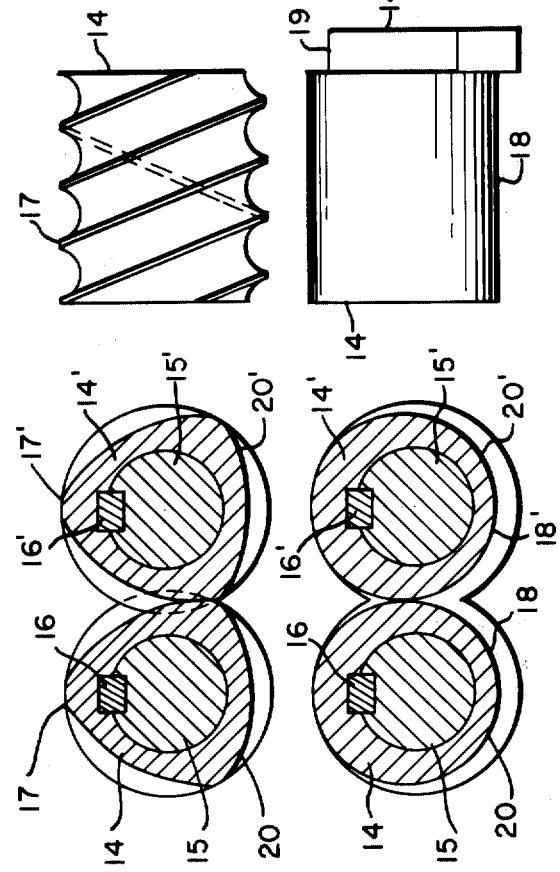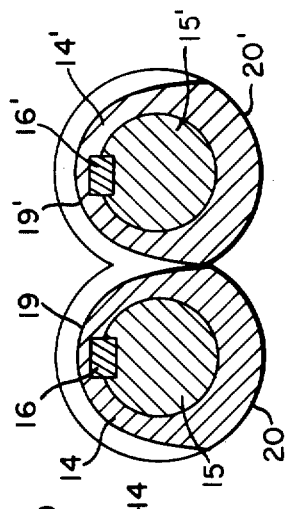

PROCESS FOR PREPARING CONCENTRATED ACRYLONITRILE POLYMER SOLUTIONS

BACKGROUND OF THE INVENTION

This invention relates to the preparation of concentrated solutions of acrylonitrile polymer in organic solvents. More particularly, it relates to the rapid preparation of concentrated, clear, bubble-free, acrylonitrile polymer solutions of satisfactory color.

For many years spinning solutions for acrylic fibers have been prepared commercially by a process in which a slurry of acrylonitrile polymer in cold dimethylformamide or other suitable solvent is formed, held in a tank at about 70°C. and then heated to about 150°C., a process requiring several hours for formation of a clear solution. In practice, this process is limited to the preparation of solutions having a concentration of up to about 30% or slightly higher; attempts to reach higher levels of solids result in incomplete solution.

In Japanese Appln. Publn. No. 48-222328/1973 a method for forming acrylic solutions is disclosed in which a twin-screw processor is employed having a feeding section with a transport screw, a stirring section for forming a cold slurry of the acrylic polymer in the solvent, and a heating-dissolving section containing another transport screw in which the slurry is heated to 70°-100°C. to dissolve the polymer in the solvent. By the use of this method relatively rapid formation of solution is achieved; however, the concentration of solution of good quality which can be prepared is limited to about 30%, as in the method described above. Dieter Gras, in Plastics Design and Processing, August, 1972, pages 24-29, discloses a variation of this process in which the slurry is mechanically worked by kneading elements in the twin-screw processor while being subjected to a temperature substantially higher than the boiling point of the solvent. However, the use of this process leads to solutions having a color higher than is desirable.

A practical method for producing high quality concentrated solutions of acrylonitrile polymer in organic solvents has been greatly desired. Three parts of solvent are required for each part of polymer to make a 25% solution, while only two parts of solvent are required for a 33 ⅓% solution and only one part for a 50% solution.

In accordance with the present invention it has been found that clear, bubble-free acrylonitrile polymer solutions of satisfactory color, having a solids concentration by weight of up to 50% or even 75%, can be produced at high speeds. The solutions are prepared by a novel process in which a cold slurry of acrylonitrile polymer in an organic solvent is prepared in the feed end of a twin-screw processor and is then heated to a critical temperature range in the discharge end of the processor while it is intermittently squeezed in volume in a direction transverse to the axes of the screws and thereby caused to sharply accelerate in their axial direction.

SUMMARY OF THE INVENTION

Acrylonitrile polymer solutions are prepared from polymer powder and organic solvent boiling above 150°C. in a twin-screw machine having temperature-control jackets for providing a cool zone followed by a heated zone. In accordance with the invention, concentrated, clear, bubble-free acrylonitrile polymer solutions of satisfactory color are prepared by a process which comprises continuously feeding the powdered polymer into the cool zone of the twin-screw machine, injecting the organic solvent in a subsequent part of the cool zone at a rate of one to two parts solvent per one part of polymer, mixing the polymer and solvent to form a slurry at a temperature below 40°C., continuously advancing the slurry to the heated zone of the machine, advancing the slurry through a zone of reduced pressure and removing gas released from the slurry, heating the slurry at 110° to 150°C. while intermittently squeezing the slurry in directions transverse to the axes of the screws to provide sharply accelerated flow in directions of the axes, continuing the heating and intermittent squeezing to form a solution at 110° to 150°C., and finally discharging the solution from the machine.

The slurry is preferably maintained at a temperature below 30°C. in the cool zone of the machine. The acrylonitrile polymer powder preferably has a mean particle size on the order of 100 microns, with less than 1% of the powder having a particle size of 1 millimeter or greater. The solvent is preferably dimethylformamide, but may be any of the other organic solvents boiling above 150°C. which are used in preparing solutions of acrylonitrile polymers for spinning.

DESCRIPTION OF THE DRAWINGS

The invention will be better understood by reference to the attached drawings, in which FIG. 1 is a schematic side view of a conventional twin-screw devolatizing processor together with polymer and solvent feed apparatus;

FIG. 2 is a schematic side view of one screw of a conventional twin-screw processor, showing the arrangement of elements mounted upon the shaft of the screw;

FIG. 3a is a sectional view taken on line 3a—3a of FIG. 2, looking from the feed end of the twin-screw processor, showing the cross-section of the three-tip screw elements mounted in the twin-bore barrels;

FIG. 3b is a sectional view taken on line 3b—3b of FIG. 2, looking from the feed end of the twin-screw processor, showing the cross-section of the circular eccentric elements mounted in the twin-bore barrels;

FIG. 3c is a sectional view taken on line 3c—3c of FIG. 2, looking from the discharge end of the twin-screw processor, showing the cross-section of one-tip elements mounted in the twin-bore barrels;

FIG. 4a is a detailed side view of one of the three-tip screw elements shown in FIG. 3a; and FIG. 4b is a detailed side view of a circular eccentric element and a one-tip element of the types shown in cross-section in FIGS. 3b and 3c, mounted together as shown schematically in FIG. 2.

DETAILED DESCRIPTION OF THE INVENTION

The first step in forming a concentrated acrylonitrile polymer solution of high quality is the formation of an intimately mixed slurry of powdered polymer in the solvent. When the particles of polymer contact the solvent, there is a tendency for the particles to adhere to one another, forming agglomerates. If the temperature of the solvent is initially too high or if the temperature of the mixture is increased before the agglomerates are broken up, the agglomerates coalesce into "dough balls" — partially solvated polymer masses of high viscosity — which are very difficult to dissolve. In forming a good slurry of the polymer in the solvent, it is therefore important to keep the slurry cool or cold. The temperature is desirably below about 40°C. and preferably below 30°C. An intimately mixed slurry is formed by mechanically working the cool or cold polymer/solvent mixture as it is being transported by the twin screws.

A critical feature of the present invention is the subsequent heating of the intimately mixed slurry to a temperature in the range of 110°–150°C. to convert it into a concentrated solution. When a temperature lower than about 110°C. is employed, concentrated solutions of high quality are not formed. At temperatures higher than 150°C., the color of the solution product is adversely affected.

Another critical feature of the present invention is the step of imparting a high extensional strain in the polymer/solvent mixture while it is heated within the temperature range of 110°–150°C. In this aspect of the process, the polymer/solvent mixture is intermittently squeezed in volume in a direction transverse to the axes of the screws and thereby caused to sharply accelerate in their axial direction.

Preferably, the polymer/solvent mixture is intermittently squeezed in volume transverse to the axes of the screws and thereby sharply accelerated in their axial direction in both the feed (cold) and discharge (hot) ends of the processor.

The intimately mixed slurry is passed through a zone of reduced pressure to exhaust air introduced with the feed of powdered polymer. This step releases and removes gases trapped in the slurry, leading to a bubble-free solution product. The slurry may be subjected to the reduced pressure prior to heating, but it is preferred to apply the reduced pressure after heating has commenced.

Referring to FIG. 1, the process of the invention is suitably carried out in a conventional twin-screw devolatilizing processor 1 comprised of jacketed twin-bore barrels 2 joined together to form an elongated enclosure for corotating twin screws 20 and 20' inside the enclosure driven by motor 5. Acrylonitrile polymer powder is fed from polymer bin 6 by conventional powder feeder 7 to injection port 8. Solvent for the acrylonitrile polymer is fed from solvent storage tank 9 to pump 10 and then to injection port 11. Cool fluid, such as cold water, is circulated in the jackets of the barrels at the feed end of the processor to provide cooled zone A. Hot fluid, such as steam, may be circulated in the jackets of the barrels at the discharge end of the processor to provide heated zone B. Alternatively, electric heating elements may be used to supply heat in zone B.

FIG. 2 illustrates an arrangement of elements on screw 20, beginning with a section 21 of right-handed screws with a fine screw pitch upstream of the injection ports and followed by three sections of pumping screws. The first pumping section 22 comprises right-handed screws with a relatively coarse screw pitch, into which section the components of the solution are injected through ports 8 and 11, while the other two pumping sections 23 and 24 comprise right-handed screws of progressively finer screw pitches. As shown in FIGS. 3a and 4a, these screw sections are assembled by sliding bushings 14 and 14' on shafts 15 and 15' to form the twin screws 20 and 20'. Keys 16 and 16' prevent rotation of the bushings with respect to the axis and thereby maintain the desired surface configuration of the screw. The screw elements of sections 21, 22, 23, and 24 are bushings having three-tipped cross sections 17 and 17' as illustrated in FIG. 3a with the cross sections being continuously rotated along the length of the axes of the bushings to evolve triple-threaded screw surfaces as illustrated in FIG. 4a. The pitch and fineness of the screw surfaces are regulated as desired, and the bushing-to-bushing and bushing-to-wall clearances are kept small so that the screw elements wipe one another and the wall as the shafts rotate together in the same direction.

At the end of cooled zone A, following the pumping section, are two homogenizing sections 25 and 26. Each of the homogenizing sections comprises interspersed circular eccentric elements and one-tip elements of the type disclosed by Erdmenger in his U.S. Pat. No. 2,670,188. The circular eccentric elements, illustrated in FIGS. 3b and 4b, comprise bushings having circular surfaces 18 and 18' eccentrically positioned on the shafts in such a way that the circular elements continuously wipe one another while the wall is wiped by the point farthest from the shaft on each circular element. The one-tip elements, illustrated in FIGS. 3c and 4b, have outer surfaces 19 and 19', each having a radius corresponding to the radius of one bore of the inside wall of the vessel except for a small clearance, cut away by an arc to leave a crescent-shaped opening throughout most of the circumference of the element. The one-tip elements continuously wipe one another while their outer surfaces wipe the walls of the vessel. The one-tip element is preferably placed on the shaft with the wall-wiping portion of its outer surface opposed, preferably by a 180° angle, from the wall-wiping point of the circular eccentric element which precedes it on the shaft. Each of the homogenizing sections is followed by a left-handed screw section of short length, 27 and 28 respectively, and a right-handed screw section 29 of fine pitch precedes the second homogenizing section 26.

The section of screw 20 which lies within heated zone B begins with a right-handed screw section 30 of coarse pitch. A vacuum is maintained over this section by means of vacuum port 35, equipped with a set of stuffing screws 36. Since the vacuum is applied over coarse right-handed screws immediately following a left-handed screw section of fine pitch, the right-handed screw section tends to run starved, which assists the operation of venting the gases. The stuffing screws in the vacuum port prevent the port from clogging. Screw section 30 is followed by a pumping section 31 of right-handed screws of fine pitch, a homogenizing section 32 of circular elements and one-tip elements, a left-handed screw section 33 of short length, and a final discharge section 34 of right-handed screws of fine pitch. The solution product is extruded from the processor through discharge conduit 12.

In operation, the circular eccentric elements in the homogenizing zones of the processor form, together with the inner wall of the twin-bore enclosure, a space of crescent-like cross section which decreases in area with the rotation of the shafts, forcing polymer/solvent mixture contained within the limits of the elements to be sharply accelerated, both forwards and backwards, in the direction of the axis, so that the mixture undergoes high extensional strain. The one-tip elements cooperate in a similar way to squeeze the polymer/solvent mixture in volume in a direction transverse to the axis and cause it to sharply accelerate in the axial direction.

After the crescent-shaped space has decreased to a minimum, it begins to increase again, creating a low pressure zone into which the polymer/solvent mixture rushes, again causing a high extensional strain in the mixture. For greatest effect, the circular eccentric elements and one-tip elements are mounted on the shaft of the screw in opposition to one another, and the effect is further increased by incorporating left-handed screw elements following the circular eccentric and one-tip elements to create back pressure.

The imposition of high extensional strain in the polymer/solvent mixture is especially important in the heated zone of the mixture wherein the mixture is undergoing solution. The sharp acceleration of the mixture within the critical temperature range of 110°–150°C. greatly aids in breaking up agglomerates which are resistant to going into solution when the polymer/solvent mixture is heated, particularly in forming the concentrated solutions with which this invention is concerned. The use of transport screws alone in the heated section leads to solutions of poor quality. Three-tip kneading blocks, which are commonly used to provide mechanical working in twin-screw processors, also fail to give concentrated solutions of good quality. When the three-tip kneading blocks are used, the cross-sectional passage area in the processor remains fairly constant, and very little extensional strain is induced in the polymer/solvent mixture.

In practicing the present invention, it is important that twin-screw processor be constructed so that the screws have rather close clearances between each other and between the screws and their respective barrel walls. A radial clearance on the order of 1 part in 400 of the diameter of the screw has been found to work very well. The polymer fed to the twin-screw processor should be in the form of a powder. Good results have been obtained from acrylonitrile polymer having a mean particle size on the order of 100 microns, with less than 1% of the polymer having a particle size of 1 mm. or greater. Pigments, toners, and other solid additives of fine particle size may be added with the polymer or elsewhere in the feed zone of the processor.

Any suitable organic solvent having a boiling point greater than 150°C. may be used to make solutions in accordance with the invention. Examples include dimethylformamide (b.p. 153°C.), dimethylacetamide (b.p. 165°C.), dimethylsulfoxide (b.p. 189°C.), and tetramethylene sulfone (b.p. 285°–8° at 743 mm.). Other solvents may also be employed; however, the ease of forming concentrated solutions of acrylonitrile polymer is dependent to some extent on the specific solvent selected. For forming solutions of up to about 50% solids by weight a vacuum sufficient only to vent air and other gases is applied in the vent at the beginning of the heated zone B. To prepare even more concentrated solutions, a vacuum of sufficiently high level to volatilize a portion of the solvent from the slurry is applied. The processor may also be equipped with another vent in the pumping section of the cooled zone A; this facilitates the feeding of powdered polymer through injection port 8 when high throughput is desired.

The invention will be further illustrated by the following examples.

EXAMPLES 1-8

A twin-screw processor apparatus is assembled in general accordance with FIGS. 1–4 from commercially available equipment and screw elements (based on Model ZSK-83-V of Werner and Pfleiderer Corp., Waldwick, N.J., and Stuttgart, Germany). The screws, when assembled, have a diameter of 83 mm. with a radial clearance of 0.2 mm. and a total screw length of 2810 mm., the first 1785 mm. corresponding to cooled zone A and the final 1025 mm. to heated zone B. The elements comprising cooled zone A are as follows:

| Length | Element |
| --- | --- |
| 90 mm. | Right-handed screw of 45 mm. pitch |
| 540 | Right-handed screw of 90 mm. pitch |
| 150 | Right-handed screw of 75 mm. pitch |
| 405 | Right-handed screw of 45 mm. pitch |
| 60 | Circular eccentric element |
| 10 | One-tip element |
| 30 | Circular eccentric element |
| 10 | One-tip element |
| 60 | Left-handed screw of 60 mm. pitch |
| 270 | Right-handed screw of 45 mm. pitch |
| 30 | Circular eccentric element |
| 10 | One-tip element |
| 30 | Circular eccentric element |
| 10 | One-tip element |
| 80 | Left-handed screw of 60 mm. pitch |

The screw elements comprising heated zone B are as follows:

| Length | Element |
| --- | --- |
| 420 mm. | Right-handed screw of 90 mm. pitch |
| 270 | Right-handed screw of 45 mm. pitch |
| 60 | Circular eccentric element |
| 10 | One-tip element |
| 30 | Circular eccentric element |
| 10 | One-tip element |
| 60 | Left-handed screw of 60 mm. pitch |
| 165 | Right-handed screw of 45 mm. pitch |

In a series of examples for which data and results are listed in Table I below, acrylonitrile polymer powder is fed to the twin-screw processor described above at a point 165 mm. from the upstream end of the screws at the respectively indicted rate for each example. Dimethylformamide (DMF) is injected in three streams at points 515 mm., 645 mm., and 755 mm. from the upstream end of the screws at a total rate indicated for each example in the table. Zone A is cooled by circulating water at room temperature, about 20°C., through the jackets of the barrels in the zone. The screws are operated together in the clockwise direction, viewed from the discharge end, at equal speeds of 320 rpm (315 rpm in Ex. 1), thereby advancing the acrylonitrile polymer powder into the dimethylformamide and transporting the polymer/solvent mixture to homogenizing sections 25 and 26 wherein the mixture is worked into an intimately mixed cold slurry by the circular eccentric elements and one tip elements. The barrel temperature at the end of cooled zone A is measured and recorded in the table as $T_1$ for each example.

Through operation of the twin screws the cold slurry is continuously transported to heated zone B where solutioning occurs. Zone B is heated by electric heating elements surrounding the barrels in the zone. As the slurry passes into the heated zone, it is subjected to a vacuum in section 30 to vent air and any other noncondensable gas from the slurry. The pressure measured at the vent is listed in the table. The slurry is heated rapidly as it is transported by the right-handed screw sections in zone B, the barrel temperatures at the end of section 30 and near the end of section 31 being measured and recorded in the table as $T_3$ and $T_4$, respectively. The partially dissolved slurry is next transported into homogenizing section 32 wherein it is squeezed in volume in a direction transverse to the axes of the screws and thereby caused to sharply accelerate in their axial direction. The barrel temperature in the final right-handed screw section 34 is also recorded in the table as $T_5$, and the temperature of the exiting solution product is recorded as $T_6$. Also recorded is the rate of discharge of solution product. The solutions are of good color. Solution quality, determined by overall appearance, is observed and recorded for each of the examples. Solutions are rated excellent which have no significant agglomerates, gels, or bubbles; while solutions which are rated good have only slight deviations from clarity.

At the conclusion of Table I are listed the results of comparative examples A, B, and C. In these comparative examples, outside the scope of the invention, the twin-screw processor apparatus is modified by replacing the circular eccentric elements and one-tip elements in homogenizing sections 25, 26, and 32 by conventional three-tip kneading blocks. As shown in the table, the solutions obtained by using the three-tip kneading blocks are of poor quality, i.e., they contain visible agglomerates and gels.

EXAMPLES 9 and 10

The apparatus of Examples 1-8 is modified by omitting homogenizing section 25 and replacing it by a right-handed screw section of 45 mm. pitch (thereby employing only one homogenizing section in cooled zone A). This apparatus is employed for two additional runs for which the data and results are listed in Table II as Examples 9 and 10. In these examples, the screws are operated together in the clockwise direction at equal speeds of 500 rpm rather than 320 rpm as in the previous examples. Also, instead of measuring the barrel temperature at the end of cooled zone A ($T_1$), the barrel temperature is measured just after the vacuum port and recorded in Table II as $T_2$. In Table II, as in Table I, the rate of discharge of solution product and the rate of DMF feed are measured, and the rate of polymer feed and the concentration of the solution product are calculated from these measurements. As noted in the table, the product solutions obtained are of excellent quality.

At the conclusion of Table II are listed the results of Comparative Examples D and E. In these comparative examples, outside the scope of the invention, the twin-screw processor apparatus is modified by removing homogenizing section 32 and left-handed screw section 33 from zone B and replacing them by a transporting section of right-handed screws of the same length. As shown in the table, the solutions obtained by removing the homogenizing section from zone B are of poor quality, i.e., they contain visible agglomerates and gels.

In operating the twin-screw processor in accordance with the present invention, it is observed that most of the heat supplied to the heated zone B is derived adiabatically from mechanical working of the polymer/solvent mixture by the screw elements in the homogenizing section. It is observed that the circular eccentric elements and the one-tip elements are particularly effective in supplying heat to the heated zone.

TABLE I

Preparation of Concentrated Acrylic Solutions in Twin-Screw Processor at ca. 320 rpm. Screw Speed And Comparison With Three-Tip Kneading Blocks Used in Heated Zone

| Example | (1) Discharge Of Solution Product, Kg/Hr | (2) DMF Feed, Kg/Hr | (3) Polymer Feed, Kg/Hr* | Barrel Temperatures, °C. | | | | Temp. of Exiting Solution, °C. $T_6$ | Solution Product, % Solids** | Absolute Pressure, Torr | Solution Quality |
|---|---|---|---|---|---|---|---|---|---|---|---|
| | | | | $T_1$ | $T_3$ | $T_4$ | $T_5$ | | | | |
| 1 | 340 | 210 | 130 | 20 | 80 | 110 | 112 | 115 | 38 | 170 | Excellent |
| 2 | 350 | 222 | 128 | 20 | 80 | 120 | 130 | 114.5 | 37 | 180 | " |
| 3 | 350 | 195 | 155 | 35 | 70 | 108 | 88 | 119.5 | 44 | 140 | Good |
| 4 | 360 | 195 | 165 | 30 | 89 | 118 | 88 | 130 | 46 | 130 | " |
| 5 | 350 | 210 | 140 | 25 | 88 | 128 | 126 | 139 | 40 | 160 | " |
| 6 | 350 | 225 | 125 | 25 | 82 | 130 | 148 | 128 | 36 | 130 | Excellent |
| 7 | 350 | 225 | 125 | 20 | 80 | 122 | 124 | 117 | 36 | 130 | " |
| 8 | 350 | 225 | 125 | 30 | 105 | 140 | 138 | 147 | 36 | 50 | " |
| Comparative Examples | | | | | | | | | | | |
| A | 355 | 225 | 130 | 25 | 78 | 130 | 139 | 127 | 37 | 160 | Poor |
| B | 353 | 210 | 143 | 20 | 70 | 122 | 137 | 130 | 41 | 150 | " |
| C | 350 | 195 | 155 | 30 | 70 | 120 | 120 | 132 | 44 | 160 | " |

*Calculated as (3) = (1) − (2)
**Calculated as (3)/(1)

TABLE II

Preparation of Concentrated Acrylic Solutions in Twin-Screw Processor at 500 rpm. Screw Speed And Comparison With Transport Screws Used Alone in Heated Zone

| Example | Discharge Of Solution Product, Kg/Hr | DMF Feed, Kg/Hr | Polymer Feed, Kg/Hr | Barrel Temperatures, °C. | | | | Temp. of Exiting Solution, °C. $T_6$ | Solution Product, % Solids | Absolute Pressure, Torr | Solution Quality |
|---|---|---|---|---|---|---|---|---|---|---|---|
| | | | | $T_2$ | $T_3$ | $T_4$ | $T_5$ | | | | |
| 9 | 386 | 232 | 154 | 60 | 92 | 120 | 120 | 130 | 40.7 | 600 | Excellent |
| 10 | 385 | 229 | 156 | 60 | 92 | 120 | 118 | 129 | 40.0 | 600 | " |
| Comparative Examples | | | | | | | | | | | |

TABLE II-continued

Preparation of Concentrated Acrylic Solutions in Twin-Screw Processor at 500 rpm. Screw Speed And Comparison With Transport Screws Used Alone in Heated Zone

| Example | Discharge Of Solution Product, Kg/Hr | DMF Feed, Kg/Hr | Polymer Feed, Kg/Hr | Barrel Temperatures, °C. | | | | Temp. of Exiting Solution, °C. $T_6$ | Solution Product, % Solids | Absolute Pressure, Torr | Solution Quality |
|---|---|---|---|---|---|---|---|---|---|---|---|
| | | | | $T_2$ | $T_3$ | $T_4$ | $T_5$ | | | | |
| D | 420 | 248 | 172 | 100 | 118 | 120 | 118 | 128 | 40.0 | 600 | Poor |
| E | 416 | 248 | 168 | 100 | 118 | 121 | 118 | 129 | 39.8 | 600 | " |

The acrylonitrile polymers used to make the solutions produced by the process of this invention are defined as long-chained synthetic polymers composed of acrylonitrile units of the formula

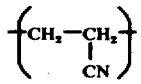

in the polymer chain. As is well understood, the term includes the homopolymer of acrylonitrile (i.e., polyacrylonitrile) and copolymers of at least 60% by weight of acrylonitrile and one or more suitably monoethylenically unsaturated monomers copolymerizable with acrylonitrile. Among the typical addition monomers exemplary of those which are copolymerizable with polyacrylonitrile are methyl acrylate, methyl methacrylate, vinyl acetate, styrene, methacrylamide, methacrylonitrile, vinyl chloride, vinyl bromide, vinylidene chloride, methyl vinyl ketone and the like as well as any of the available vinyl pyridines. The preferred comonomers include methyl acrylate, vinyl acetate, vinyl chloride, styrene, and the vinyl pyridines. Sulfonate comonomers can also be employed, e.g., the sulfonated styrenes, vinyl sulfonate, allyl sulfonate, methallyl sulfonate and their alkali-metal or alkaline-earth-metal salts, and the like; it being necessary only that the compound chosen from this class be copolymerizable with acrylonitrile to the desired extent. The preferred sulfonate comonomers are the sulfonated styrenes.

I claim:

1. In the preparation of acrylonitrile polymer solutions from polymer powder and an organic solvent selected from the group consisting of dimethylformamide, dimethylacetamide, dimethylsulfoxide and tetramethylenesulfone in a twin-screw machine having temperature-control jackets for providing a cool zone followed by a heated zone; the process for preparing concentrated, clear, bubble-free, acrylonitrile polymer solutions of satisfactory color which comprises continuously feeding the powdered polymer into the cool zone of the twin-screw machine, injecting the organic solvent in a subsequent part of the cool zone at a rate of one to two parts solvent per one part of polymer, mixing the polymer and solvent to form a slurry at a temperature below 40°C., continuously advancing the slurry to the heated zone of the machine, advancing the slurry through a zone of reduced pressure and removing gas released from the slurry, heating the slurry at 110° to 150°C. while intermittently squeezing the slurry in directions transverse to the axes of the screws to provide sharply accelerated flow in directions of the axes, continuing the heating and intermittent squeezing to form a solution at 110° to 150°C., and finally discharging the solution from the machine.

2. The process defined in claim 1 wherein the slurry is maintained at a temperature below 30°C. in the cool zone of the machine.

3. The process defined in claim 1 wherein the polymer powder has a mean particle size on the order of 100 microns, with less than 1% of the powder having a particle size of 1 millimeter or greater.

4. The process defined in claim 1 wherein the solvent is dimethylformamide.

* * * * *